(12) United States Patent
Dangoor et al.

(10) Patent No.: US 11,914,704 B2
(45) Date of Patent: Feb. 27, 2024

(54) METHOD AND SYSTEM FOR DETECTING COORDINATED ATTACKS AGAINST COMPUTING RESOURCES USING STATISTICAL ANALYSES

(71) Applicant: INTUIT INC., Mountain View, CA (US)

(72) Inventors: Sheer Dangoor, Hod Hasharon (IL); Ido Meir Mintz, Hod Hasharon (IL)

(73) Assignee: INTUIT INC., Mountain View, CA (US)

( * ) Notice: Subject to any disclaimer, the term of this patent is extended or adjusted under 35 U.S.C. 154(b) by 530 days.

(21) Appl. No.: 17/143,959

(22) Filed: Jan. 7, 2021

(65) Prior Publication Data
US 2022/0215091 A1 Jul. 7, 2022

(51) Int. Cl.
*G06Q 30/02* (2023.01)
*G06F 21/55* (2013.01)
*G06Q 20/38* (2012.01)
*G06Q 20/40* (2012.01)

(52) U.S. Cl.
CPC .......... *G06F 21/552* (2013.01); *G06F 21/554* (2013.01); *G06Q 20/382* (2013.01); *G06Q 20/4016* (2013.01); *G06F 2221/034* (2013.01); *G06F 2221/2101* (2013.01)

(58) Field of Classification Search
CPC .................. G06Q 20/382; G06Q 20/4016
See application file for complete search history.

(56) References Cited

U.S. PATENT DOCUMENTS

| | | | | |
|---|---|---|---|---|
| 7,815,106 | B1 * | 10/2010 | McConnell | G06Q 30/02 235/377 |
| 8,805,737 | B1 * | 8/2014 | Chen | G06Q 40/00 235/380 |
| 10,290,001 | B2 * | 5/2019 | Adjaoute | G06Q 20/384 |

(Continued)

OTHER PUBLICATIONS

"Anomaly Detection using Unsupervised Methods: Credit Card Fraud Case Study" (Rezapour, Mahdi et al., International Journal of Advanced Computer Science and Applications vol. 10. No. 11 2019 ) (Year: 2019).*

*Primary Examiner* — James M Detweiler
(74) *Attorney, Agent, or Firm* — Patterson + Sheridan, LLP

(57) ABSTRACT

Certain embodiments of the present disclosure provide techniques for identifying and blocking anomalous transactions within a computing system. An example method generally includes selecting a set of accounts for analysis. For each respective account, an anomaly score is calculated based on an account number associated with the respective account and transaction amounts associated with the respective account. An aggregated anomaly score is generated for each respective account provider of a plurality of account providers based on the anomaly score associated with each respective account. The aggregated anomaly score for each respective account provider is normalized based on a historical minimum and historical maximum anomaly score for the respective account provider. One or more account providers that are potential targets of anomalous activity are identified. One or more actions are taken to block completion of transactions requested by one or more accounts associated with the identified one or more account providers.

18 Claims, 7 Drawing Sheets

(56) References Cited

U.S. PATENT DOCUMENTS

| | | | | |
|---|---|---|---|---|
| 2004/0039686 A1* | 2/2004 | Klebanoff | ............. | G06Q 40/03 |
| | | | | 705/40 |
| 2020/0118136 A1* | 4/2020 | Zhang | ................. | G06Q 20/405 |
| 2020/0211021 A1* | 7/2020 | Allbright | ............... | G06Q 20/34 |

* cited by examiner

# METHOD AND SYSTEM FOR DETECTING COORDINATED ATTACKS AGAINST COMPUTING RESOURCES USING STATISTICAL ANALYSES

INTRODUCTION

Embodiments of the present disclosure relate to anomaly detection in computing systems, and more specifically to detecting large scale, coordinated attacks against resources in computing systems.

BACKGROUND

Anomaly detection systems are generally used to detect and mitigate the effect of malicious activity in a computing system. For example, anomaly detection systems can be used to detect anomalous requests to generate network traffic within a computing system, anomalous requests to generate or delete virtual compute instances, anomalous requests to perform various transactions using the computing system, or the like. Generally, these anomaly detection systems may be configured to examine various properties of activity in a computing system, such as the source of the activity, the time at which a request to perform activity in the computing system was generated, user attributes associated with the activity, and parameters in the request. These anomaly detection systems may identify activity as anomalous or potentially anomalous where the properties of the activity are significantly different from typical activity seen in a computing system.

To avoid detection, malicious actors may thus use coordinated attacks, sometimes known as a "salami slicing" attack, in which individual actions, in the aggregate, cause anomalous activity to be performed in a computing system. Each request to perform an action in a coordinated attack may have attributes that would not cause an anomaly detection system to flag these requests as potentially anomalous. For example, a coordinated attack against cloud computing resources might take the form of multiple requests to replace files with files of a similar size but with nonsensical data. In another example, a coordinated attack against a financial institution computing system might take the form of multiple requests to withdraw funds from an account rather than a small number of requests to withdraw larger amounts of funds from the account. By coordinating an attack using a plurality of individual actions that, individually, do not appear to be potentially anomalous or otherwise malicious, a coordinated attack can be executed against the computing system using a series of individual actions instead of a few actions that would ordinarily be flagged as potentially anomalous.

Accordingly, techniques are needed to detect and defend against coordinated attacks in computing systems.

BRIEF SUMMARY

Certain embodiments provide a computer-implemented method for identifying and blocking anomalous transactions within a computing system. The method generally includes selecting a set of accounts for analysis. The selected set of accounts generally includes accounts associated with requests to perform transactions using the computing system. For each respective account in the set of accounts, an anomaly score is calculated based on an account number associated with the respective account and transaction amounts associated with the respective account. An aggregated anomaly score is generated for each respective account provider of a plurality of account providers based on the anomaly score associated with each respective account in the set of accounts associated with the respective account provider. The aggregated anomaly score for each respective account provider is normalized based on a historical minimum and historical maximum anomaly score for the respective account provider. Based on a threshold value and the normalized aggregated anomaly score for each respective account provider, one or more account providers that are potential targets of anomalous activity are identified. One or more actions are taken to block completion of transactions requested by one or more accounts associated with the identified one or more account providers.

Other embodiments provide a system comprising a processor and a non-transitory computer-readable memory storing instructions that, when executed by the processor, perform an operation for detecting anomalous activity in a computing system. The operation generally includes selecting a set of accounts for analysis. The selected set of accounts generally includes accounts associated with requests to perform transactions using the computing system. For each respective account in the set of accounts, an anomaly score is calculated based on an account number associated with the respective account and transaction amounts associated with the respective account. An aggregated anomaly score is generated for each respective account provider of a plurality of account providers based on the anomaly score associated with each respective account in the set of accounts associated with the respective account provider. The aggregated anomaly score for each respective account provider is normalized based on a historical minimum and historical maximum anomaly score for the respective account provider. Based on a threshold value and the normalized aggregated anomaly score for each respective account provider, one or more account providers that are potential targets of anomalous activity are identified. One or more actions are taken to block completion of transactions requested by one or more accounts associated with the identified one or more account providers.

Still further embodiments provide a computer-implemented method for identifying and blocking anomalous activity against resources in a computing system. The method generally includes selecting a set of accounts for analysis. The selected set of accounts generally includes accounts associated with requests to perform activity within the computing system with respect to a one of a plurality of account providers. For each respective account in the set of accounts, an anomaly score is calculated based on an account identifier associated with the respective account and properties of requests to perform activity within the computing system generated by a user associated with the respective account. An aggregated anomaly score is generated for each respective account provider of the plurality of account providers based on the anomaly score associated with each respective account in the set of accounts associated with the respective account provider. The aggregated anomaly score for each respective account provider is normalized based on a historical minimum and historical maximum anomaly score for the respective account provider. Based on a threshold value and the normalized aggregated anomaly score for each respective account provider, one or more account providers that are potential targets of anomalous activity are identified. One or more actions are taken to block activity generated by one or more accounts associated with the identified one or more account providers.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain embodiments of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
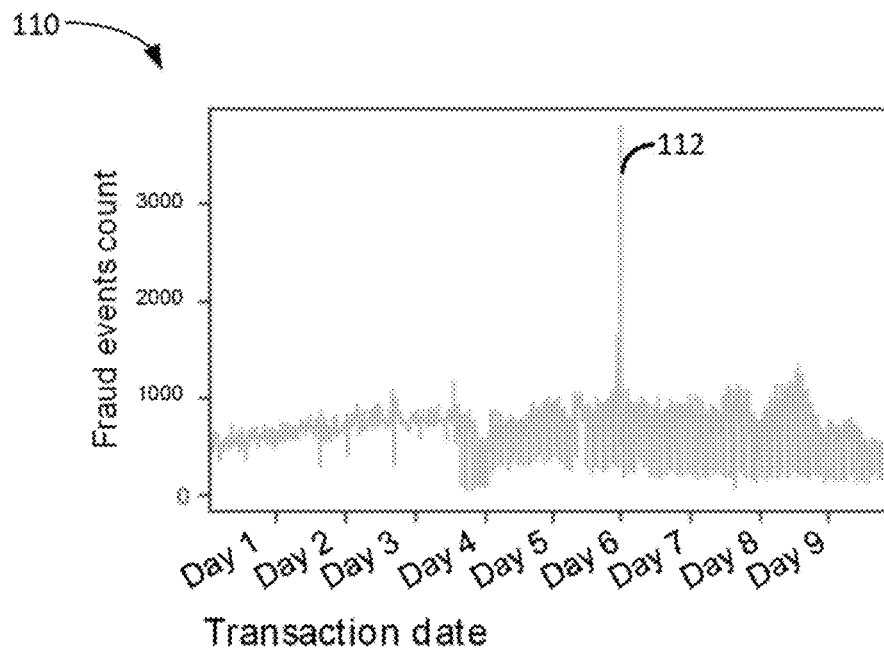
FIG. 1 is a timeline illustrating the occurrence of a coordinated attack performed using a computing system.
Figure 1:
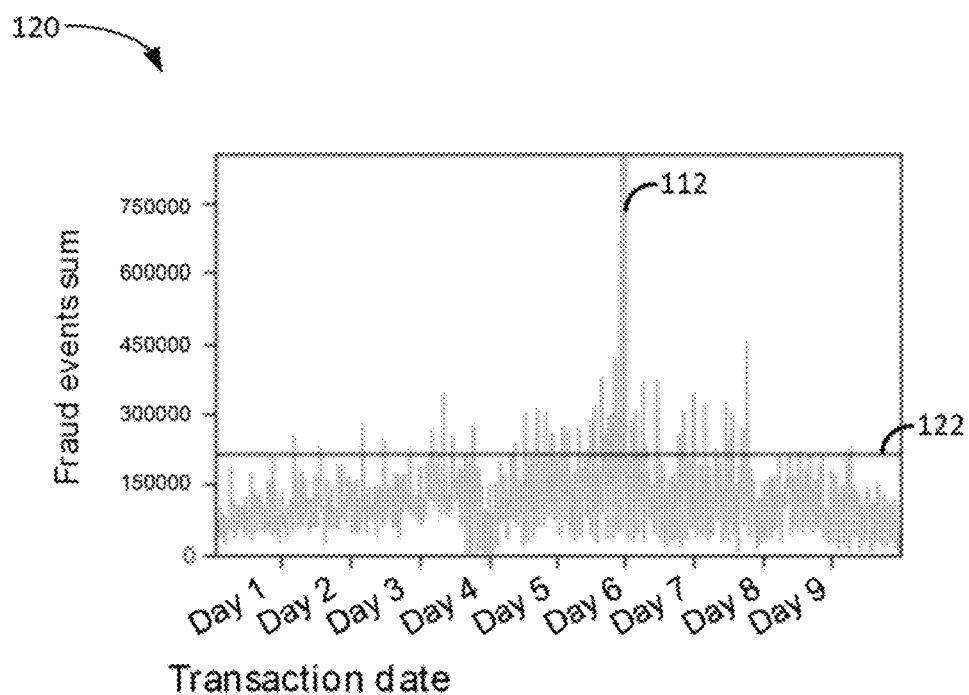

Embodiments of the present disclosure provide apparatuses, methods, processing systems, and computer-readable mediums for identifying targets of coordinated attacks in a computing system based on normalized aggregated anomaly scores generated based on transactions generated by accounts associated with the identified targets and historical information. Generally, targets of coordinated attacks in a computing system may be targets, such as account providers accessible through the computing system, against which a large number of requests are generated by previously unknown accounts. As discussed, each individual request may not appear anomalous; however, in the aggregate, each of these requests may constitute a coordinated attack against the provider (or other target in the computing system).

Anomaly detection generally allows for various attributes of computer systems to be monitored for the occurrence of anomalous activity that may be probative of security, performance, or other issues in a computing environment. Activity that is similar to previously recorded non-anomalous activity in the computing environment may be deemed non-anomalous because of the similarity to other non-anomalous activities in the computing environment. In such a case, a system may grant a user access to access-controlled resources, allow for the continued use of components (e.g., services) already deployed in a computing environment, and so on. Activity that is significantly different from previously recorded non-anomalous activity in the computing environment, however, may be deemed anomalous because of the size of the difference between the activity under examination and previously recorded activities in the computing environment. For example, a system may block access to access-controlled resources, initiate a rollback to a previous stable version of components deployed in the computing environment, identify the potential existence of hardware failures in the computing environment, and so on.

Because anomaly detection allows for various security and performance problems to be detected in a computing environment, techniques for detecting anomalies in the computing environment may be a powerful tool in maintaining the security and performance of services deployed in the computing environment. As discussed, however, anomaly detection of a single data point (e.g., a single request to perform activity within or through a computing system) in isolation may not account for relationships between different data points. Thus, an anomaly detection system may determine that the properties of a single data point are non-anomalous, even though the single data point, in conjunction with other data points, may represent in the aggregate a coordinated attack against a target.

Embodiments of the present disclosure use statistical analyses of activity performed against targets in a computing system to determine whether activity in a computing system corresponds, in the aggregate, to a coordinated attack against a target. As discussed in further detail below, to determine whether a target is subject to a coordinated attack, requests to perform an action generated against the target by a set of accounts may be scored based on an account identifier and properties of the request, and an aggregated anomaly score for the target may be generated from the scores associated with each request associated with the target. The aggregated anomaly score may be normalized and used to determine whether the target is the subject of a coordinated attack, and various actions may be performed to prevent execution of the coordinated attack such that the target is not affected by malicious actors. By using a normalized, aggregated anomaly score generated based on the anomaly scores for each of a plurality of requests executed against a target in a computing system, embodiments of the present disclosure may detect that a computing system is under attack even though the individual requests taken in isolation may indicate that each individual request corresponds to non-anomalous (or non-malicious) activity. Thus, techniques described herein may improve the security of computer systems by, for example, augmenting anomaly detection systems configured to determine whether individual requests to perform an action in a computing system corresponds to anomalous or non-anomalous activity with further anomaly detection techniques that may detect other attacks that may not be detected using analyses of individual requests in isolation.

Example Coordinated Attacks Against Targets in a Computing System

FIG. 1 illustrates timelines 110 and 120 showing activity generated during a coordinated attack against resources in or accessible through a computing system. A coordinated attack may be, as discussed, an attack in which multiple requests are generated against a specific resource and in which the properties of each individual request may not appear anomalous to an anomaly detection system configured to determine whether individual requests correspond to anomalous or non-anomalous activity. However, in the aggregate, the requests may represent a concerted attempt to perform malicious actions against the resources in or accessible through a computing system.

Timeline 110 illustrates a number of fraudulent events (or other anomalous activity) detected within the computing system over a period of time. As illustrated, fraudulent events are detected throughout the duration of timeline 110. Typically, the number of fraudulent events detected within the computing system during each discrete time period (e.g., per day) may remain relatively consistent, and a regular pattern may appear in the data. For example, fraudulent events may occur frequently during weekdays, but may not occur as frequently during weekends or holidays, and the number of fraudulent events may remain relatively consistent (e.g., within some amount from an average number of fraudulent events per day) over time. Spike 112 in timeline 110, however, illustrates a significant deviation from the number of fraudulent events that occurred on the day associated with spike 112. Thus, spike 112 illustrates the occurrence of a coordinated attack against a resource in a computing system.

Timeline 120 illustrates the total amount of money lost from the fraudulent transactions illustrated in timeline 110. Over the time period illustrated in timelines 110 and 120, an average amount 122 is lost, represented by the line going across the timeline 120. However, at spike 112, a significantly larger amount than amount 112 is lost due to the coordinated attack that occurred at spike 112. As discussed, however, because the coordinated attack was the result of multiple requests that in isolation were not identified as anomalous or fraudulent requests until after the requests were processed, the requests were processed and thus caused a significant loss to be incurred on the data at which spike 112 occurred.

Statistically, certain characteristics are apparent in the requests that are generated in a coordinated fraud attack. In a banking example, for example, accounts generally have account numbers that are defined by a monotonically increasing function. That is, newer accounts generally have larger account numbers, and older accounts generally have smaller account numbers. Statistically, fraudulent transactions are likely to be requested or performed by newer accounts, since old accounts that were previously associated with fraudulent transactions may be closed by the account issuers after those old accounts are linked to fraudulent activity. Further, the amount per transaction in a fraudulent transaction may be higher than the amount per transaction for legitimate transactions.

Figure 2:
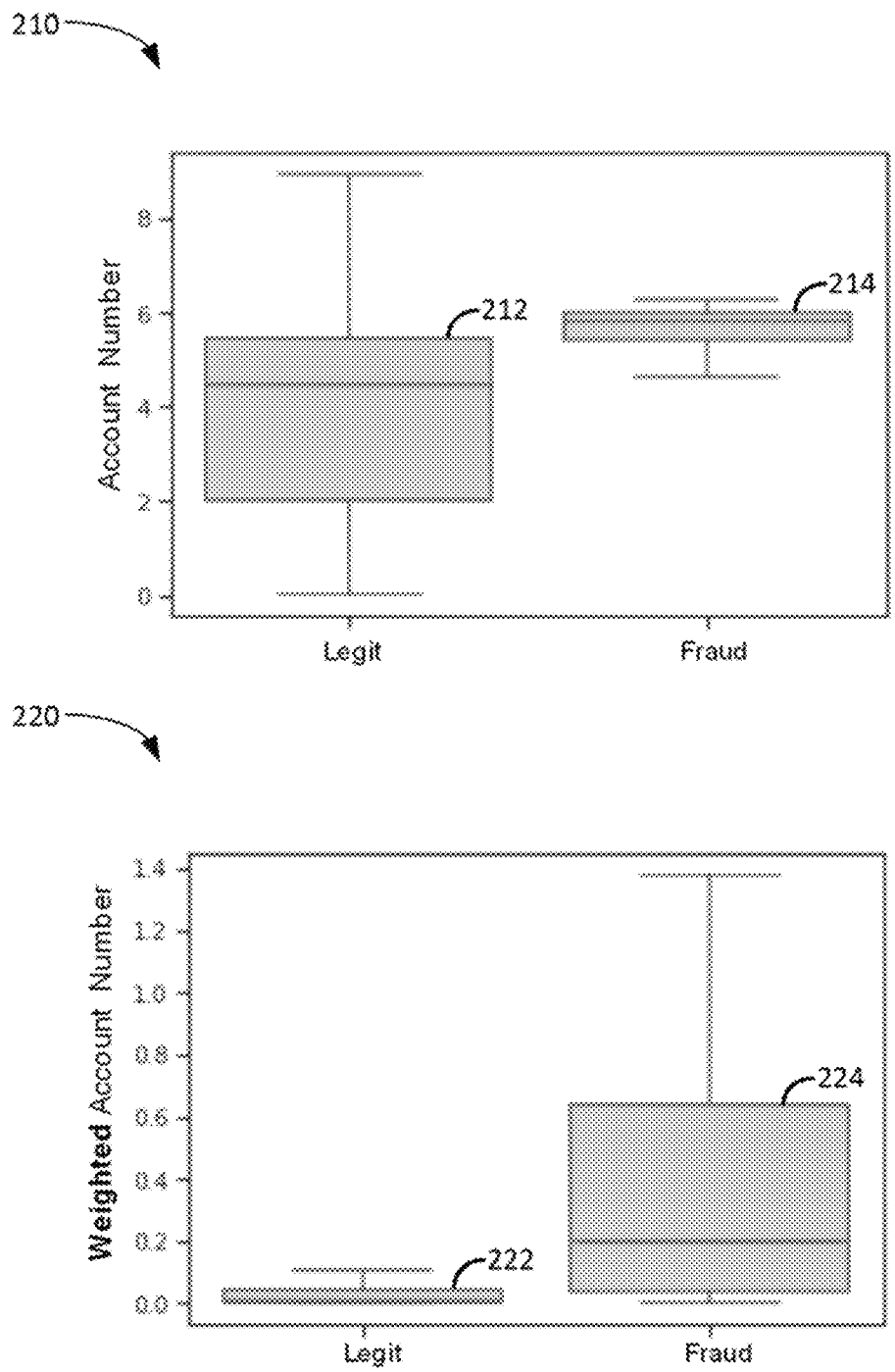
FIG. 2 illustrates a statistical comparison of legitimate and fraudulent transactions performed using a computing system.

FIG. 2 illustrates a statistical analysis of legitimate and fraudulent transactions, based on the characteristics discussed above. Chart 210 illustrates a statistical analysis of account numbers used to perform legitimate and fraudulent transactions. As illustrated, legitimate transactions may use a wide range of account numbers (i.e., may be performed using accounts of any age), and the bulk of transactions may be performed using accounts with account numbers within box 212, representing a wide range of account numbers with a wide range of corresponding ages. However, fraudulent transactions may use a narrow range of account numbers (e.g., account numbers associated with newer accounts, since older accounts used to conduct fraudulent transactions may be closed or otherwise unavailable for use in performing new transactions), and the bulk of these transactions may be performed using accounts within box 214, representing a narrow range of newer account numbers relative to the account numbers used for legitimate transactions.

Chart 220 illustrates a statistical analysis of account numbers used to perform legitimate and fraudulent transactions, weighted by the amount of the transactions performed using these account numbers (hereinafter a "weighted account number"). As illustrated, legitimate transactions may have a smaller weighted account numbers, as these transactions may be associated with smaller transaction amounts and may be performed using older accounts with smaller account numbers. The bulk of legitimate transactions may have weighted account numbers within box 222. In contrast, fraudulent transactions may be performed using newer accounts with larger account numbers and may be associated with larger transaction amounts. The bulk of fraudulent transactions may have weighted account numbers within box 224, which has a wider range of weighted account numbers and may have significantly larger weighted account numbers than those associated with legitimate transactions.

Because fraudulent transactions performed in a coordinated attack have these distinct characteristics, aspects of the present disclosure leverage these characteristics to identify coordinated attacks on resources in a computing system and take actions to prevent execution of the coordinated attack in the computing system.

Figure 3:
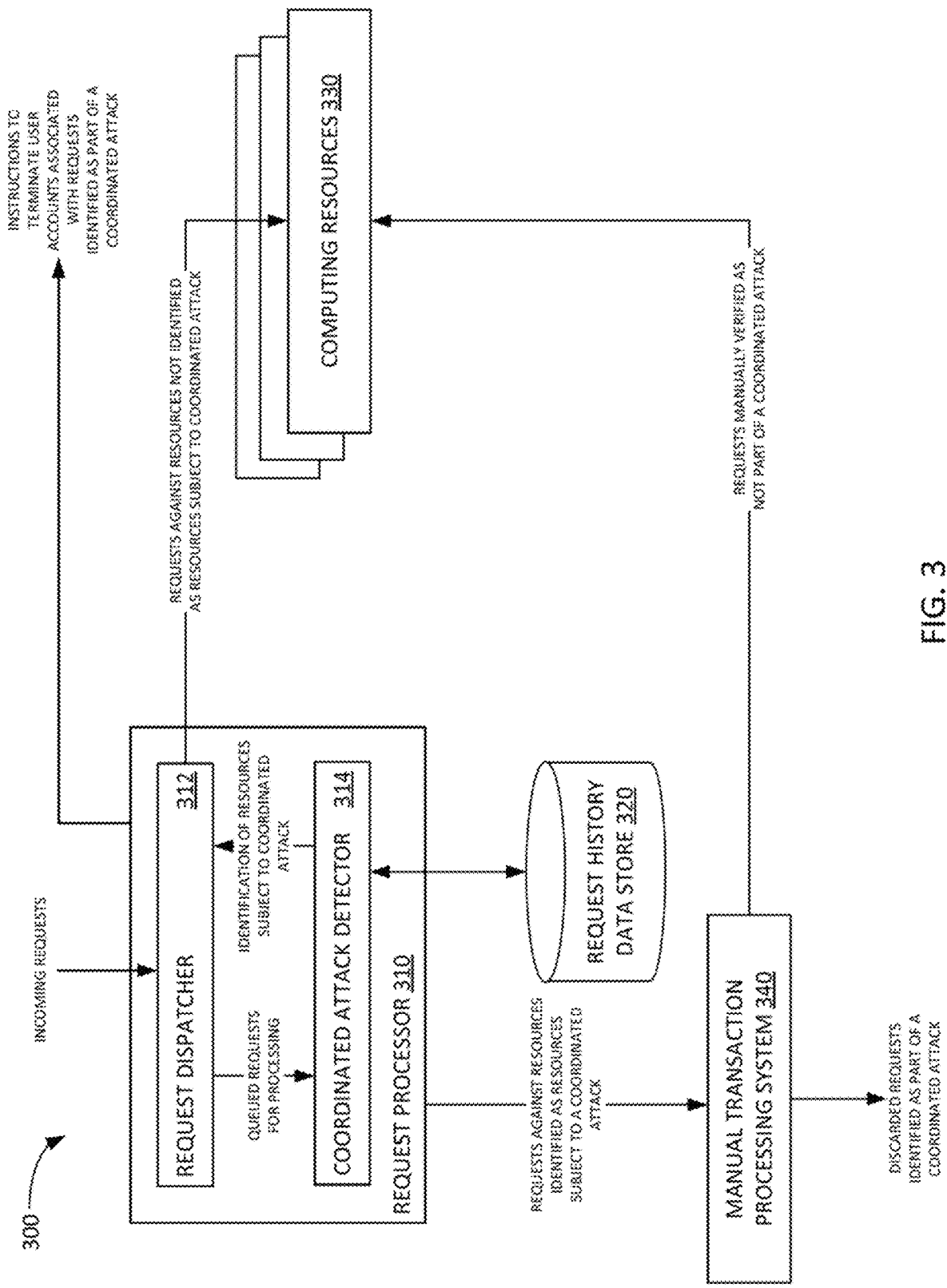
FIG. 3 depicts an example computing environment in which normalized aggregated anomaly scores are used to identify targets of coordinated attacks in a computing system and mitigate attacks against the identified targets in the computing system.

Example Systems for Identifying and Blocking of Anomalous Activity Corresponding to a Coordinated Attack Against Resources in a Computing System Associated with an Account Provider FIG. 3 illustrates an example computing environment 300 in which an anomaly detection system statistically analyzes requests in the computing system to identify resources in a computing system that are the target of a coordinated attack and defend against the coordinated attack.

As illustrated, computing environment 300 includes a request processor 310, request history data store 320, and computing resources 330. Computing environment 300 may be, for example, an environment through which requests to perform one or more actions on or with respect to computing resources 330 are received and queued at request processor 310 for batch processing. It should be recognized that processing of requests in computing environment 330 may be performed on a single physical computing device (e.g., a server), a cluster of computing devices, a virtualized environment in which services hosted by virtual machines executing on one or a cluster of computing devices, or any other computing environment in which requests to execute or perform functions may be received from external software applications or services.

Request gateway 310 generally is representative of a gateway at which requests to perform an activity on or with respect to computing resources 330 in computing environment 300 are received from an external source (e.g., a software application executing on a client device, a web application executing on a remote server, an external service interfacing with one or more computing resources 330 in computing environment 300, etc.) and queued for processing. As illustrated, request gateway 310 includes a request despatcher 312 and a coordinated attack detector 314.

Request dispatcher 312 generally receives incoming requests from external services and queues the incoming requests for processing by coordinated attack detector 314 for analysis. Generally, request dispatcher 312 may be configured to receive and queue incoming requests up to a specified cutoff time, after which received requests are queued for processing at a later time. At the specified cutoff time, request dispatcher 312 forwards the queued requests to coordinated attack detector 314, which, as will be discussed in further detail below, can determine whether a computing resource 330 is the target of a coordinated attack and can identify requests that are part of the coordinated attack against the computing resource 330.

In response to requesting an analysis of the queued requests from coordinated attack detector 314, request dispatcher 312 receives information identifying the computing resource(s) 330 that are potential targets of a coordinated attack and information identifying the requests that constitute the coordinated attack. Request dispatcher 312 can dispatch requests for processing to computing resources 330 that are not identified as potential targets of a coordinated attack, as these requests associated with computing resources that are not potential targets of a coordinated attack may be considered to be legitimate requests that do not pose a threat to the computing resources 330 in computing environment 300. Request dispatcher 312 further takes one or more actions to block the completion of requests that are associated with the computing resource(s) that are identified as targets of a coordinated attack.

In some embodiments, the actions taken to block completion of requests that are associated with the computing resource(s) that are identified as targets of a coordinated attack may include, for example, terminating automatic processing of requests associated with the identified one or more computing resources, which may be associated with one or more account providers with which users of the computing environment 300 can interact. In terminating the automatic processing of requests associated with the identified one or more computing resources, request dispatcher 312 can route these requests for additional processing (e.g., manual processing by users of a manual transaction processing system 340 in communication with request gateway 310). In some embodiments, other actions may be taken to prevent completion of the requests associated with the computing resource(s) that are targets of a coordinated attack. For example, request dispatcher 312 can take one or more actions to terminate access to a software application hosted in or accessible through computing environment 300 for users associated with user accounts through which the requests that are part of the coordinated attack are generated. By terminating access to the software application for these users, request dispatcher 312 can prevent malicious actors from using these user accounts in the future to perform a coordinated attack against computing resources 330 in computing environment 300.

In some embodiments, request dispatcher 312 can dispatch requests to computing resources 330 in a multi-stage process. In this multi-stage process, request dispatcher 312 can divide requests into a first set of requests associated with user accounts that have previously generated requests against computing resources 330 and a second set of requests associated with user accounts that have not previously generated requests against computing resources 330 within a given time period. The first set of requests may be presumed to correspond to legitimate requests, as the user accounts associated with the first set of requests correspond to user accounts that have previously performed activity within the computing environment without being flagged as participants in a coordinated attack. Thus, request dispatcher 312 can dispatch the first set of requests to the computing resources 330 for completion.

The second set of requests, however, may include requests generated by new users, and request dispatcher 312 may not be able to assume that these requests correspond to legitimate requests. Request dispatcher 312 can provide the second set of requests to coordinated attack detector 314 for further processing, and based on the analysis of these requests generated by coordinated attack detector 314, request dispatcher 312 can dispatch certain requests to computing resources 330 for processing and can take one or more actions to block completion of other requests that are likely to be a part of a coordinated attack against computing resources 330.

Coordinated attack detector 314 is generally configured to examine requests to perform activity against computing resources 330 and determine whether a computing resource 330 is a target of a coordinated attack. A request to perform activity against a computing resource 330 may include, for example, a request to perform a transaction through the computing environment 300 (e.g., a request to transfer funds from a merchant account to a specified bank account), a request to perform one or more file operations against a computing resource 330, or the like.

Generally, coordinated attack detector 314 receives information about a set of transactions to be analyzed from request dispatcher 312. Each transaction in the set of transactions may include, for example, a numerical account identifier (e.g., an account number) and one or more transaction properties from which an anomaly score for each transaction may be generated. To identify computing resources 330 that are potential targets of a coordinated attack and take action to block a coordinated attack against the targeted computing resources 330, coordinated attack detector 314 can select a set of accounts for analysis from the universe of accounts associated with the set of transactions. For example, to select the set of accounts for analysis, coordinated attack detector 314 can generate a set of account identifiers based on a difference between account identifiers found in a historical data set and account identifiers included in the received set of transactions. Doing so may exclude previously seen accounts identifiers from the set of account identifiers for which transactions are to be analyzed, based on an assumption that previously seen account identifiers correspond to accounts that have not previously been involved in a coordinated attack against computing resources associated with an account provider in the computing environment 300. In some aspects, thus, the generated set of account identifiers may include account identifiers that have not been previously seen in requests to perform actions in the computing environment 300, based on an assumption that these accounts are more likely to be involved in a coordinated attack. A first set of accounts may be generated as the set of unique identifiers found in the historical data set, and a second set of accounts may be generated as the set of unique identifiers found in the received set of transactions. The set of account identifiers that coordinated attack detector 314 can analyze may be generated as the set difference between the first set of accounts and the second set of accounts. The set of accounts for analysis may thus represent accounts for which transaction records were present in the received set of transactions, but for which transaction records were not present in the historical data set.

After selecting the set of accounts for analysis, coordinated attack detector 314 can calculate anomaly scores for each account in the set of accounts. To calculate an anomaly score for an account, coordinated attack detector 314 can calculate a weighted account number based on the account number associated with the account and the transaction amounts (or other numerical transaction information) associated with the account. Generally, the weighted account number may be represented by the equation:

$$weightedAccountNo = \sum_{i=1}^{n} accountNo * txnAmount_i$$

where i represents the $i^{th}$ of n transactions associated with the account in the set of transactions, and $txnAmount_i$ represents the amount of the $i^{th}$ transaction. For example, assume that an account has an account number of 123456 and transaction amounts of 1,000, 2,000, and 3,000. The anomaly score calculated for the account may be calculated as:

$$weightedAccountNo =$$
$$(123456 * 1000) + (123456 * 2000) + (123456 * 3000) = 740,736,000$$

To identify computing resources 330 that are targets of coordinated attacks, the accounts included in the set of accounts for analysis may be separated based on an account provider associated with each account. The account provider is generally associated with a unique computing resource 330 in computing environment 300. For example, an account provider that is associated with an account, such as a bank account provider, may have a set of computing resources 330 in the computing environment 300 against which requests are processed. Each account provider may have a unique manner by which account numbers are generated such that weighted account numbers for one account provider may not be comparable to weighted account numbers for a different account provider. For each account provider, an aggregated anomaly score may be generated as the summation of the weighted account numbers generated for each account associated with the account provider. The aggregated anomaly score for a given account provider may be represented by the equation:

$$aggregatedAnomalyScore = \sum_{j=1}^{m} weightedAccountNo_j$$

where m represents the number of accounts associated with the account provider, and $weightedAccountNo_j$ represents the weighted account number calculated, as discussed above, for the $j^{th}$ account associated with the account provider in the set of accounts.

For a given account provider, the aggregated anomaly score may be used to determine whether the computing resources 330 associated with that account provider are the target of a coordinated attack based on a comparison of the aggregated anomaly score to historical aggregated anomaly scores for the account provider. To determine whether the aggregated anomaly score for a given account provider is indicative of a coordinated attack being performed against the computing resources 330 associated with the account provider, coordinated attack detector 314 can compare the aggregated anomaly score to historical data using various techniques. For example, a time series decomposition of a historical data set, which decomposes the historical data set into a trend data set, a seasonality data set, and a residual data set, can be used to compare the aggregated anomaly score to historical data, as discussed in further detail below. Other techniques, such as auto-regressive integrated moving average time series models, the use of recurrent neural networks that learn time-based relationships of data (e.g., long-short term memory models), and the like may also or alternatively be used to compare the aggregated anomaly score to historical data.

In some embodiments, a historical data set used to generate the time series decomposition may include a historical data set of transactions performed when the computing resources 330 associated with the account provider are not the target of a coordinated attack. That is, the historical data set generally represents typical activity processed by the computing resources 330 associated with the account provider such that a coordinated attack would represent an outlier compared to the historical data set. The historical data set may include weighted account numbers generated for each discrete time period (e.g., each day) in which transactions are processed. In a financial transaction system, thus, the historical data set may include non-zero values on business days and zero values on non-business days.

In some aspects, the historical data set may be normalized to values between 0 and 1 based on a minimum and a maximum weighted account number identified in the historical data set, and the aggregated anomaly score for the account provider may be normalized based on the minimum and maximum weighted account number identified in the historical data set. In some aspects, the values may be normalized based on specific percentiles of data. For example, the values may be normalized based on the $5^{th}$ and $95^{th}$ percentile values in the historical data set, the $25^{th}$ and $75^{th}$ percentile values in the historical data set, or the $50^{th}$ percentile value in the historical data set. In still another aspect, the historical data set may be normalized based on an average calculated over the historical data set. Coordinated attack detector 314 can generate a time series decomposition of the historical data set and the normalized aggregated anomaly score for the account provider such that the historical data set and the normalized aggregated anomaly score may be decomposed into a trend data set, a seasonality data set, and a residual data set. Because account numbers generally increase over time, the trend data set may generally show a trend of increasing values. The seasonality data set generally illustrates the periodicity in which transactions occur (e.g., that transactions generally are processed on business days and are not processed on non-business days). Neither the trend data set nor the seasonality data set may be of interest in determining whether the computing resources 330 associated with the account provider are being targeted by a coordinated attack. However, the residual data set, which corresponds to a difference between the normalized data set and the sum of the trend data set and seasonality data set, may indicate whether the account provider is subject to a coordinated attack.

Thus, to determine whether the computing resources 330 associated with the account provider is subject to a coordinated attack, coordinated attack detector can examine the latest value in the residual data set (where the latest value is derived from the normalized anomaly score for the account provider) against a threshold value. The threshold value may be set as the value at a given percentile of values in the residual data set (e.g., the $75^{th}$ percentile value in the residual data set). If the latest value in the residual data set is above the threshold value, coordinated attack detector 314 can determine that the computing resources 330 associated with the account provider are targets of a coordinated attack. Otherwise, coordinated attack detector 314 can determine that the computing resources 330 associated with the account provider are not being targeted by a coordinated attack.

In some aspects, the normalized weighted account numbers across account providers may be aggregated into a single data set to determine if any computing resource 330 is the target of a coordinated attack. Generally, by aggregating the normalized weighted account numbers across different account providers, coordinated attack detector 314 can determine whether the computing resources 330 associated with a single account provider is being targeted by a coordinated attack or whether computing resources 330 associated with multiple account provides are being targeted by a coordinated attack in parallel. To determine whether any computing resource 330 is the target of a coordinated attack, coordinated attack detector 314 can perform a time series decomposition or other analysis to decompose the normalized weighted account numbers across the different account providers into a trend data set, a seasonality data set, and a residual data set representing activity aggregated across the account providers having computing resources 330 accessible through the computing environment 300. If the residual data set has a value within a normal range of values, coordinated attack detector 314 may determine that no computing resources 330 are the targets of a coordinated attack and can allow requests to be processed against the computing resources 330. Otherwise, the coordinated attack detector can determine that computing resources 330 associated with at least one account provider are the targets of a coordinated attack and can perform a per-account-provider analysis to identify which account provider (and the corresponding computing resources 330) are the targets of a coordinated attack, as discussed above.

Figure 4:
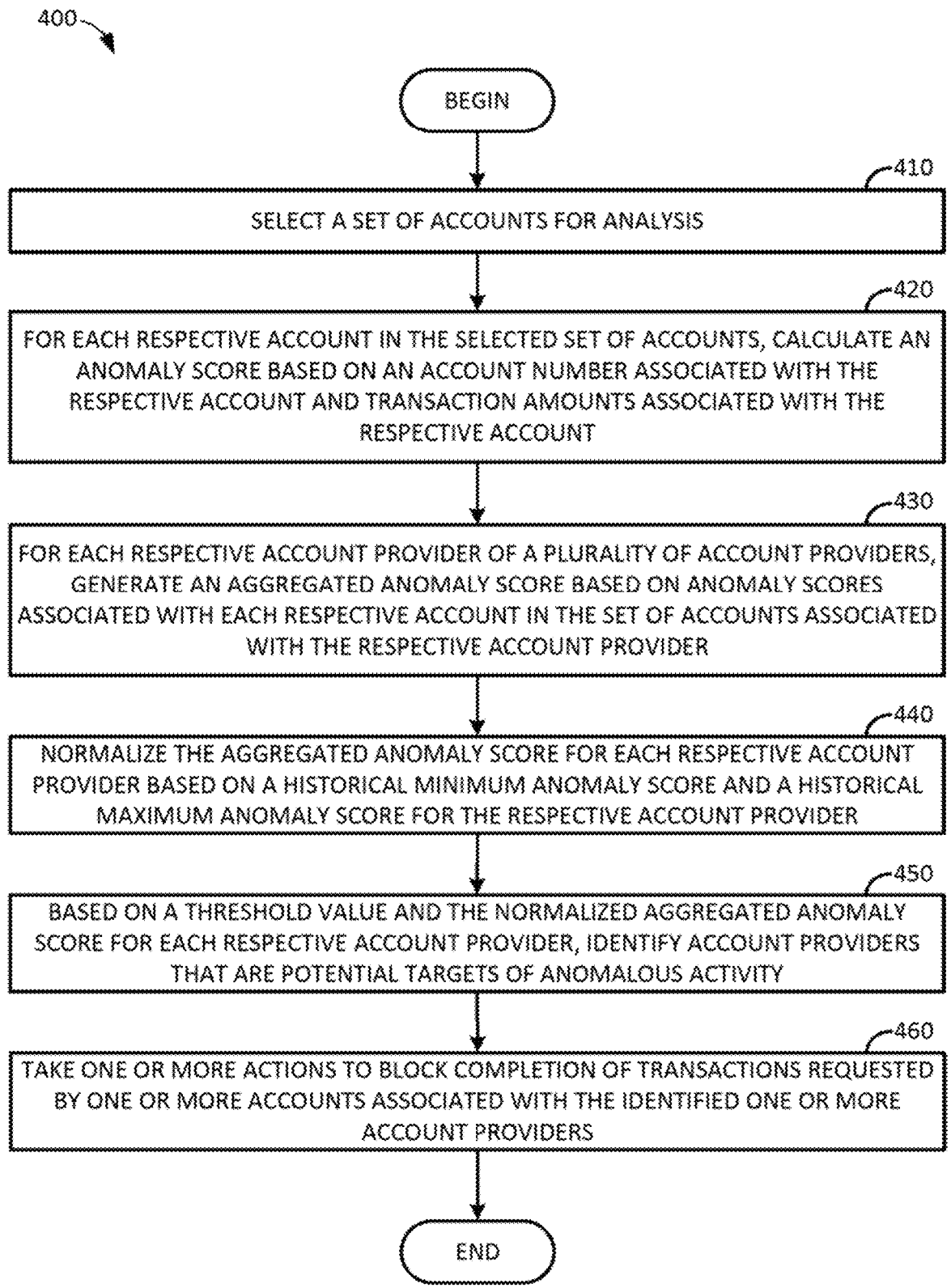
FIG. 4 illustrates example operations for identifying targets of coordinated attacks in a computing system and mitigating attacks against the identified targets based on normalized aggregated anomaly scores.

Example Identification and Blocking of Anomalous Activity Corresponding to a Coordinated Attack Against Resources in a Computing System Associated with an Account Provider FIG. 4 illustrates example operations 400 for identifying targets of coordinated attacks in a computing system and mitigating attacks against the identified targets based on normalized aggregated anomaly scores. The operations described herein may be executed by one or more systems in a computing environment (e.g., a request processor 310 illustrated in FIG. 3).

As illustrated, operations 400 begin at block 410, where a system selects a set of accounts for analysis. The selected set of accounts may include accounts associated with requests to perform transactions using a computing system. For example, the selected set of accounts may include accounts associated with requests to perform transactions against computing resources in the computing system or requests to perform transactions against external resources through the computing system. In one example, the selected set of accounts may include accounts identified as the intended receiving account of requests to transfer funds out of a merchant account. To select the set of accounts for analysis, the system can identify accounts in a current time period and a historical time period, and select accounts appearing in the current time period but not in the historical time period for analysis.

At block 420, the system calculates an anomaly score for each respective account in the selected set of accounts. The anomaly score for each account may be generated based on an account identifier associated with the respective account and other numerical data included in the requests associated with the respective account. For example, where the system is used to process requests to transfer funds from a merchant account to an external bank account, the account identifier may be the account number of the external bank account, and the other numerical data may be the amount to be transferred to the external bank account in each request. As discussed, the anomaly score generated for each respective account in the set of accounts may be represented by the equation weightedAccountNo=$\Sigma_{i=1}^{n}$ accountNo*txnAmount$_i$, where i represents the $i^{th}$ of n transactions associated with the account in the set of transactions, the n transactions comprise transactions associated with the account number performed during a given time period (e.g., transactions performed within the most recent x days), and txnAmount$_i$ represents the amount of the $i^{th}$ transaction.

At block 430, the system generates an aggregated anomaly score for each respective account provider of a plurality of account providers. The aggregated anomaly score may be generated based on anomaly scores associated with each respective account in the set of accounts associated with the respective account provider. As discussed, the aggregated anomaly score for a given account provider may be represented by the equation: aggregatedAnomalyScore=$\Sigma_{j=1}^{m}$ weightedAccountNo$_j$, where m represents the number of accounts associated with the account provider, and weightedAccountNo$_j$ represents the weighted account number calculated at block 420 for the $j^{th}$ account associated with the account provider in the set of accounts.

At block 440, the system normalizes the aggregated anomaly score for each respective account provider of the plurality of account providers. In one embodiment, the system normalizes the aggregated anomaly score based on a historical minimum and historical maximum anomaly score for the respective account provider. The historical minimum and historical maximum anomaly scores for the respective account provider may, for example, corresponding to minimum and maximum anomaly scores generated from historical transactions recorded during a time period in which it is known that the respective account provider was not the target of a coordinated attack. Generally, this time period may include records of both legitimate and fraudulent transactions; however, the fraudulent transactions that occurred during this time period may be of the types of fraudulent transactions that are typically encountered during regular operations rather than the types of fraudulent transactions that would characterize a coordinated attack against the respective account provider. For example, these fraudulent transactions may include transactions with attributes that are significantly different from typical transactions performed against the respective account provider, such as transactions with significantly larger transaction amounts.

At block 450, the system identifies one or more account providers that are potential targets of anomalous activity. These account providers may be associated with particular computing resources that may be subject to coordinated attacks. To identify account providers that are potential targets of anomalous activity, the system can compare the normalized aggregated anomaly score to a threshold value. The threshold value is generally based on a normalized historical data set for a specific account provider and may be set, for example, as a threshold percentile value within the normalized historical data set. The normalized historical data set may be generated from the data set from which the historical minimum and historical maximum anomaly scores are generated, and thus, may be a normalized version of the anomaly scores generated during a time period in which the account provider is not targeted by a coordinated attack.

At block 460, the system takes one or more actions to block completion of transactions requested by accounts associated with the identified one or more account providers. Generally, the actions taken to block completion of the transactions requested by accounts associated with the identified one or more account providers may prevent the execution of a coordinated attack against computing resources associated with the identified one or more account providers. In some embodiments, the requested transactions may be routed for manual processing. Manually processing the requested transactions may allow for further analyses to be performed against the requested transactions so that transactions that are ultimately determined to be part of a coordinated attack are blocked, while transactions that are ultimately determined to be legitimate are completed at a later time. In some embodiments, the one or more actions may also or alternatively prevent future requests from being generated by users associated with these accounts. For example, the accounts may be placed on a blocklist such that future requests associated with the accounts are automatically blocked. In another example, the system may terminate user access to a software application so that users associated with the accounts are no longer able to use their user accounts to generate future requests. By terminating user access to the software application, these users may be blocked from using accounts known to be associated with fraudulent activity in order to generate further fraudulent activity within the computing system.

Figure 5:
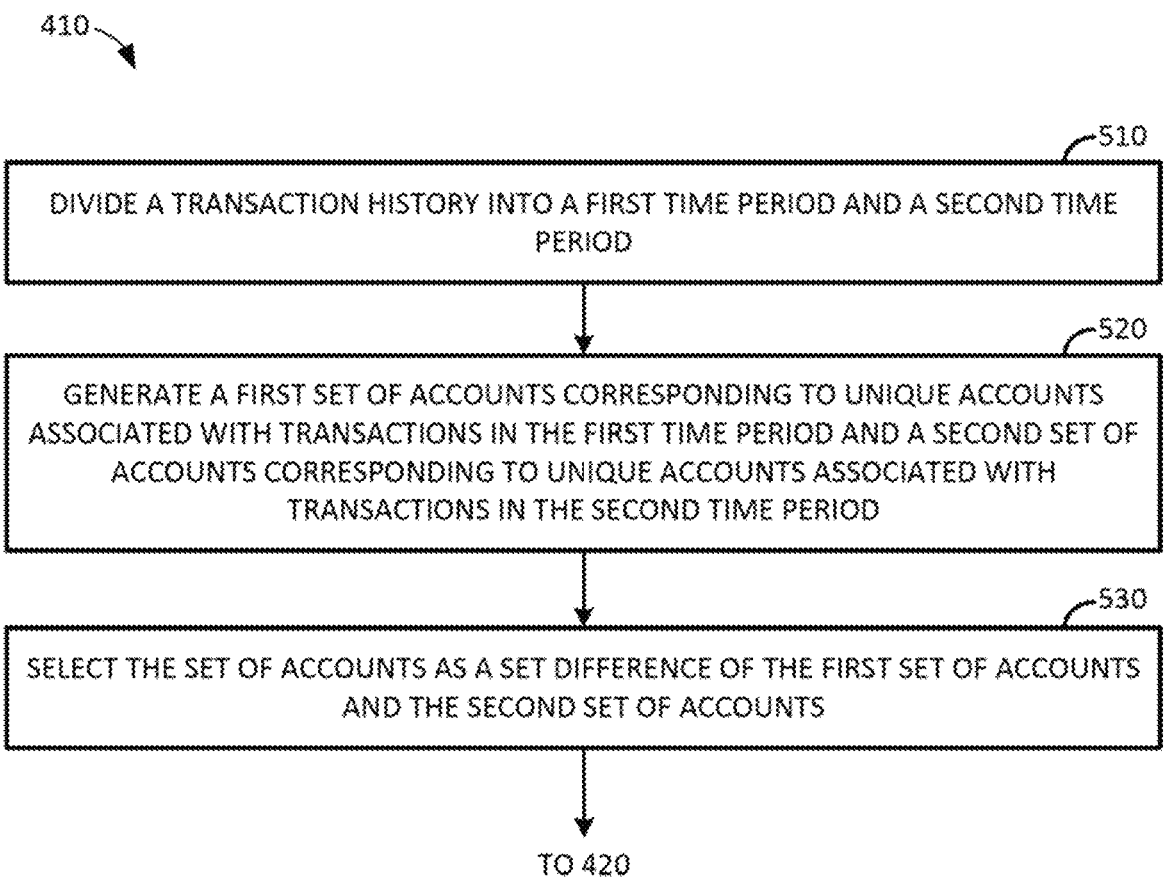
FIG. 5 illustrates example operations for selecting a set of providers in a computing system for which account activity is to be analyzed to determine whether a provider is the target of a coordinated attack.

FIG. 5 illustrates further details of block 410 (of FIG. 4) for selecting a set of accounts for analysis, according to one embodiment.

As illustrated, operations 410 may begin at block 510, where the system divides a transaction history into a first time period and a second time period. The transaction history may include pending transactions which are being analyzed to determine whether the transactions correspond to a coordinated attack against the computing resources associated with an account provider, as well as a plurality of historical transactions. The second time period may be a time period prior to a current time but after the end of a first time period, and the first time period may be a period of time prior to the beginning of the second time period. For example, the second time period may be the most recent 90 days, and the first time period may be a time period of any length ending at 91 days prior to the current time. It should be recognized, however, that any cutoff time may be used to divide the transaction history into the first time period and the second time period.

At block 520, the system generates a first set of accounts and a second set of accounts. The first set of accounts may be associated with transactions in the first time period, and the second set of accounts may be associated with transactions in the second time period. Generally, the first set of accounts and the second set of accounts may include unique accounts associated with transactions in each respective time period such that an account is included only once regardless of a number of transactions associated with the account in respective time period.

At block 530, the system selects the set of accounts as a set difference of the first set of accounts and the second set of accounts. Generally, the selected set of accounts may include accounts identified in the second set of accounts that are not included in the first set of accounts. That is, the selected set of accounts may include accounts for which no transactions were included in the transaction history over the first time period. The selected set of accounts may thus include newly created accounts, as well as previously dormant accounts that are now being used.

Figure 6:
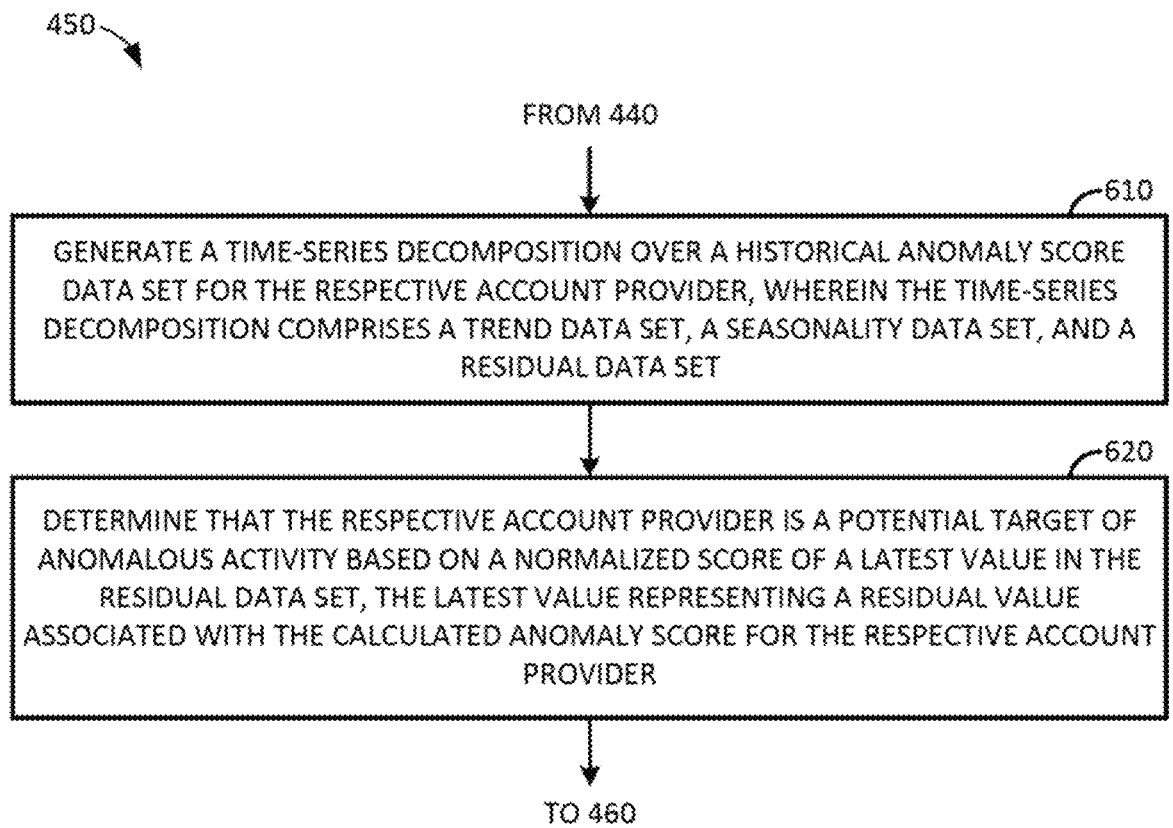
FIG. 6 illustrates example operations for identifying, from a selected set of providers in a computing system, providers that are potential targets of a coordinated attack based on normalized aggregated anomaly scores.

FIG. 6 illustrates further details of block 450 (of FIG. 4) for identifying one or more account providers that are potential targets of anomalous activity, according to one embodiment.

As illustrated, block 450 begins at block 610, where the system generates, for each respective account provider of the plurality of account providers, a time-series decomposition over a historical anomaly data set for the respective account provider. The time-series decomposition may include a trend data set, a seasonality data set, and a residual data set. Generally, the trend data set may show an increasing trend line, as the aggregated weighted account numbers (or other weighted anomaly scores) may be based on account numbers that have increasing values as new accounts are generated. The seasonality data set generally illustrates fluctuations in the aggregated weighted account numbers that corresponds to the occurrence of transactions during certain time periods and the non-occurrence of transactions during other time periods (e.g., processing of transaction requests on business days and not processing transaction requests on non-business days). The residual data set corresponds to a difference between the actual aggregated weighted account numbers (or normalized versions thereof) and the sum of the trend data set and the seasonality data set for each data point in the historical data set. Generally, the residual data set may include data that can be used to determine that the computing resources associated with an account provider are the target of a coordinated attack, as higher values in the residual data set may indicate that more fraudulent activity is being performed against the computing resources associated with the account provider.

At block 620, the system determines that the respective account provider is a potential target of anomalous activity based on a normalized score of a latest value in the residual data set. The latest value in the residual data set generally represents a residual value associated with the calculated anomaly score for the respective account provider. As discussed, a threshold value may be established for the normalized score of the latest value in the residual data set. The score may be normalized based on a minimum and maximum residual score for data points in the data set corresponding to a time period in which it is known that the respective account provider is not the target of a coordinated attack (e.g., based on a data set excluding the latest value and data derived therefrom, as the latest value generally corresponds to an anomaly score for activity being analyzed to determine whether the account provider is potentially a target of a coordinated attack).

In some aspects, the operations illustrated in FIG. 6 may be performed in response to determining that at least one account provider is potentially a target of a coordinated attack. To determine whether at least one account provider is potentially a target of a coordinated attack, the system can aggregate the normalized aggregated anomaly scores for each account provider of the plurality of account providers into a global value using various statistical techniques, such as a percentile value, a mean, a sum, or the like. The global normalized anomaly score may be analyzed using various techniques, such as the time-series decomposition techniques discussed above, auto-regressive integrated moving average time series models, long-short term memory models, or the like, to determine whether at least one account provider is the target of a coordinated attack. Still further, in some aspects, the aggregation of normalized anomaly scores across each of the plurality of account providers, and the analysis of such scores using the techniques described herein, may allow for the detection of coordinated attacks occurring in parallel against multiple account providers (and their associated computing resources).

Figure 7:
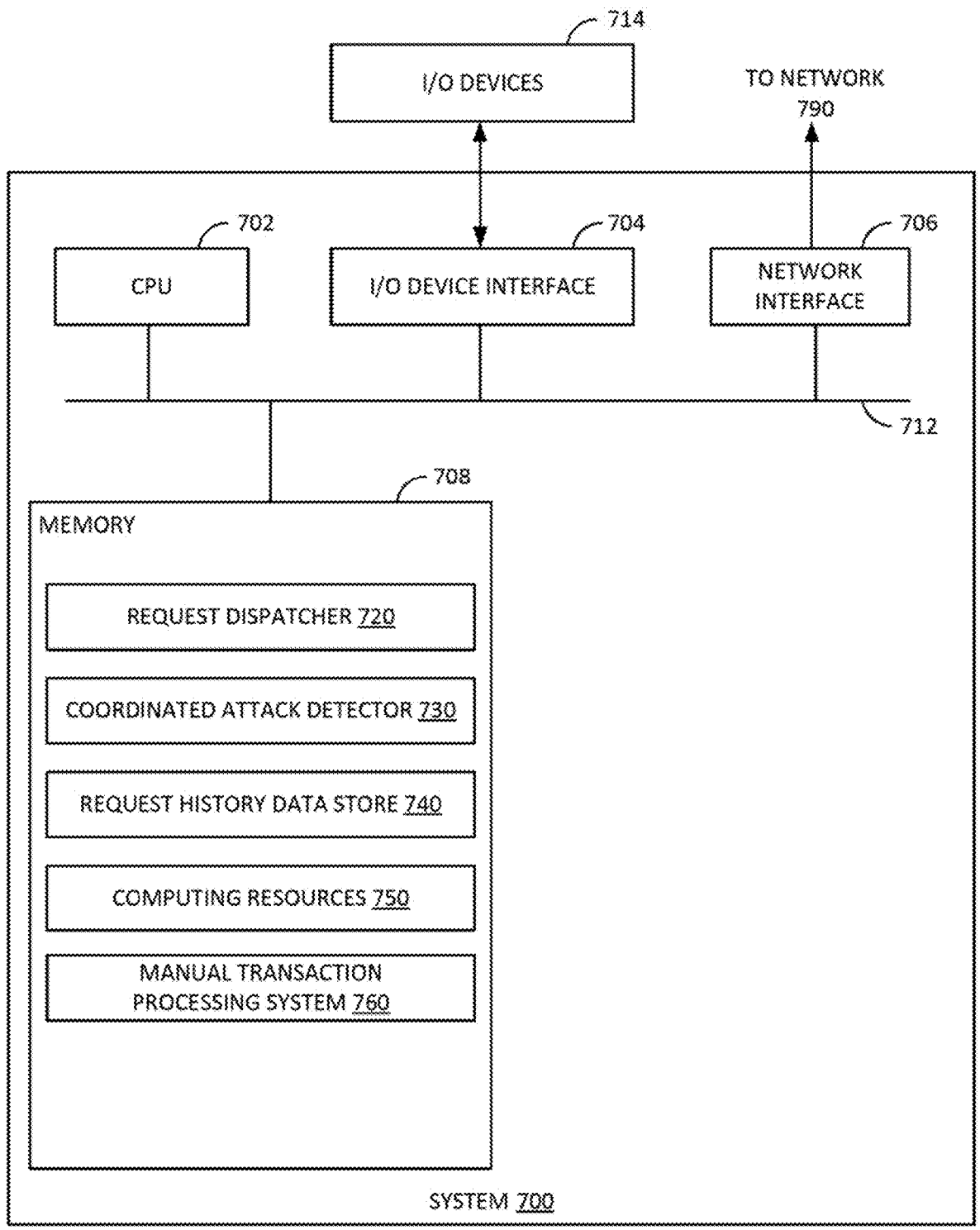
FIG. 7 illustrates an example computing system on which embodiments of the present disclosure may be implemented.

Example Systems for Identifying and Blocking of Anomalous Activity Corresponding to a Coordinated Attack Against Resources in a Computing System Associated with an Account Provider FIG. 7 illustrates an example system 700 that can detect coordinated attacks against resources in a computing system associated with an account provider. For example, system 700 may comprise one or both of request gateway 110 and/or one or more computing resources 130 illustrated in FIG. 1.

As shown, system 700 includes a central processing unit (CPU) 702, one or more I/O device interfaces 704 that may allow for the connection of various I/O devices 714 (e.g., keyboards, displays, mouse devices, pen input, etc.) to the system 700, network interface 706 through which system 700 is connected to network 770 (which may be a local network, an intranet, the internet, or any other group of computing devices communicatively connected to each other), a memory 708, storage 710, and an interconnect 712.

CPU 702 may retrieve and execute programming instructions stored in the memory 708. Similarly, the CPU 702 may retrieve and store application data residing in the memory 708. The interconnect 712 transmits programming instructions and application data, among the CPU 702, I/O device interface 704, network interface 704, memory 708, and storage 710.

CPU 702 is included to be representative of a single CPU, multiple CPUs, a single CPU having multiple processing cores, and the like.

Memory 708 is representative of a volatile memory, such as a random access memory, or a nonvolatile memory, such as nonvolatile random access memory, phase change random access memory, or the like. As shown, memory 708 includes a request dispatcher 720, a coordinated attack detector 730, request history data store 740, and computing resources 750.

Request dispatcher 720 may correspond to request dispatcher 312 illustrated in FIG. 3 generally receives requests to perform one or more actions within a computing system. The requests may be queued for batch processing such that the set of requests received prior to a defined cutoff time are processed at or after the defined cutoff time. To process the requests, request dispatcher 720 can provide the set of requests to coordinated attack detector 730 (which may correspond to coordinated attack detector 314 illustrated in FIG. 3) for analysis, and subsequently, request dispatcher 720 can receive, from coordinated attack detector 730, information identifying computing resources that are targets of a coordinated attack and information about the accounts and requests that are part of the coordinated attack. Requests that are associated with accounts not identified by coordinated attack detector 730 may be routed to computing resources 750 (which may correspond to computing resources 330 illustrated in FIG. 3) for execution. Request dispatcher 720, however, may terminate automatic processing of requests that are associated with accounts identified by coordinated attack detector 730 as targets of a coordinated attack to prevent the execution of a coordinated attack against computing resources 750.

Coordinated attack detector 730 generally receives set of requests from request processor 720 and identifies computing resources 750 (which may be associated with various account providers) that are the targets of coordinated attacks. To identify computing resources 750 that are the targets of coordinated attacks, coordinated attack detector 730 can separate a historical data set, including the set of requests received from request processor 720 and other requests in request history data store, into a first data set and a second data set. The first data set may include requests that are older than some defined age, and the second data set may include requests that are newer than the defined age. Unique accounts associated with the first data set and the second data set are generated, and the coordinated attack detector 730 identifies the accounts that are of interest for further analysis based on a set difference between the first data set and the second data set such that the identified accounts include accounts for which requests are included in the second data set, but not in the first data set.

For each respective request associated with the identified accounts in the second data set, coordinated attack detector 730 generates an anomaly score based on an account identifier of the account identified in the respective request and various properties of the request. For example, in a request to transfer funds from a merchant account to a bank account, coordinated attack detector 730 can generate an anomaly score as the account number of the bank account, weighted by the amount of funds specified in the request. The anomaly scores generated for each request are aggregated on a per-account-provider basis, and the aggregated anomaly score for each account provider is normalized and compared to a historical data set (generated from request data stored in request history data store 740, which may correspond to request history data store 320 illustrated in FIG. 3 and may include historical transaction data against which statistical analyses of current transactions can be performed) to determine whether computing resources associated with an account provider are the targets of a coordinated attack. In some aspects, the normalized aggregated anomaly scores may also be aggregated across account providers using various statistical techniques, such as aggregation and normalization based on a given percentile value, a global mean, global median, upper and lower bound percentile values, or the like, and the normalized aggregated anomaly scores may also be compared to a historical data set (generated from request data stored in request history data store 740) to determine whether any of computing resources 750 are being targeted by a coordinated attack. Coordinated attack detector 730 can respond to the request for information from request dispatcher 720 with information identifying the account providers (and the corresponding computing resources 750) that are targeted by a coordinated attack, and, as discussed above, request dispatcher 720 can use this information to block completion of a coordinated attack against the identified account providers and the corresponding computing resources 750. In some aspects, request dispatcher 720 and/or coordinated attack detector 730 can route requests associated with accounts flagged as potential participants of a coordinated attack to a manual transaction processing system 760 (corresponding to manual transaction processing system 340 illustrated in FIG. 3) for further processing and/or transmit instructions, via network interface 706, to terminate user credentials associated with the accounts flagged as potential participants of a coordinated attack.

ADDITIONAL CONSIDERATIONS

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the embodiments set forth herein. In addition, the scope of the disclosure is intended to cover such an apparatus or method that is practiced using other structure, functionality, or structure and functionality in addition to, or other than, the various embodiments of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for identifying and blocking anomalous transactions within a computing system, comprising:
    selecting a set of accounts for analysis, wherein the selected set of accounts comprise accounts associated with requests to perform transactions using the computing system;
    for each respective account in the selected set of accounts, calculating an anomaly score based on an account number associated with the respective account and transaction amounts associated with the respective account;
    generating, for each respective account provider of a plurality of account providers, an aggregated anomaly score based on anomaly scores associated with each respective account in a set of accounts associated with the respective account provider;
    normalizing the aggregated anomaly score for each respective account provider of the plurality of account providers based on a historical minimum score and a historical maximum anomaly score for the respective account provider;
    based on a threshold value and the normalized aggregated anomaly score for each respective account provider, identifying one or more account providers that are potential targets of anomalous activity; and
    taking one or more actions to block completion of transactions requested by one or more accounts associated with the identified one or more account providers, wherein the one or more actions comprise terminating access to a software application for users associated with accounts associated with the identified one or more account providers.

2. The method of claim 1, further comprising:
    generating a global normalized anomaly score by aggregating the normalized aggregated anomaly score for each of the respective account providers into a global value and normalizing the global value based on a global historical minimum and global historical maximum anomaly score; and
    determining, based on the global normalized anomaly score, that at least one account provider is a target of anomalous activity, wherein
    identifying the one or more account providers that are potential targets of anomalous activity is further based on the determining, based on the global normalized anomaly score, that at least one account provider is a target of anomalous activity.

3. The method of claim 1, wherein selecting the set of accounts for analysis comprises:
    dividing a transaction history into a first time period and a second time period; and
    generating a first set of accounts corresponding to unique accounts associated with transactions in the first time period and a second set of accounts corresponding to unique accounts associated with transactions in the second time period; and
    selecting the set of accounts as a set difference of the first set of accounts and the second set of accounts.

4. The method of claim 3, wherein the second time period comprises an amount of time prior to a current time, but after the first time period, at which anomalous activity within the computing system is being analyzed, and the first time period comprises an amount of time prior to the second time period.

5. The method of claim 1, wherein identifying the one or more account providers that are potential targets of anomalous activity comprises, for each respective account provider of the plurality of account providers:
    generating a time-series decomposition over a historical anomaly score data set for the respective account provider, wherein the time-series decomposition comprises a trend data set, a seasonality data set, and a residual data set; and
    determining that the respective account provider is a potential target of anomalous activity based on a normalized score of a latest value in the residual data set, the latest value representing a residual value associated with the calculated anomaly score for the respective account provider.

6. The method of claim 1, wherein the historical minimum score comprises a minimum score calculated from a time period over which the respective account provider was not subject to a concentrated attack, and the historical maximum anomaly score comprises a maximum score calculated from a time period over which the respective account provider was not subject to a concentrated attack.

7. The method of claim 1, wherein the threshold value for the respective account provider comprises a normalized value below which a threshold percentage of historical normalized aggregated anomaly scores for the respective account provider exists in a historical data set.

8. The method of claim 1, wherein the taking one or more actions to block completion of transactions requested by one or more accounts associated with the identified one or more account providers comprises terminating automatic processing of transactions associated with the identified one or more account providers.

9. A system, comprising:
a processor; and
a memory having instructions stored thereon which, when executed by the processor, performs an operation for identifying and blocking anomalous transactions within a computing system, the operation comprising:
selecting a set of accounts for analysis, wherein the selected set of accounts comprise accounts associated with requests to perform transactions using the computing system;
for each respective account in the selected set of accounts, calculating an anomaly score based on an account number associated with the respective account and transaction amounts associated with the respective account;
generating, for each respective account provider of a plurality of account providers, an aggregated anomaly score based on anomaly scores associated with each respective account in a set of accounts associated with the respective account provider;
normalizing the aggregated anomaly score for each respective account provider of the plurality of account providers based on a historical minimum score and a historical maximum anomaly score for the respective account provider;
based on a threshold value and the normalized aggregated anomaly score for each respective account provider, identifying one or more account providers that are potential targets of anomalous activity; and
taking one or more actions to block completion of transactions requested by one or more accounts associated with the identified one or more account providers, wherein taking one or more actions comprises terminating access to a software application for users associated with accounts associated with the identified one or more account providers.

10. The system of claim 9, wherein the operation further comprises:
generating a global normalized anomaly score by aggregating the normalized aggregated anomaly score for each of the respective account providers into a global value and normalizing the global value based on a global historical minimum and global historical maximum anomaly score; and
determining, based on the global normalized anomaly score, that at least one account provider is a target of anomalous activity, wherein
identifying the one or more account providers that are potential targets of anomalous activity is further based on the determining, based on the global normalized anomaly score, that at least one account provider is a target of anomalous activity.

11. The system of claim 9, wherein selecting the set of accounts for analysis comprises:
dividing a transaction history into a first time period and a second time period; and
generating a first set of accounts corresponding to unique accounts associated with transactions in the first time period and a second set of accounts corresponding to unique accounts associated with transactions in the second time period; and
selecting the set of accounts as a set difference of the first set of accounts and the second set of accounts.

12. The system of claim 11, wherein the second time period comprises an amount of time prior to a current time, but after the first time period, at which anomalous activity within the computing system is being analyzed, and the first time period comprises an amount of time prior to the second time period.

13. The system of claim 9, wherein identifying the one or more account providers that are potential targets of anomalous activity comprises, for each respective account provider of the plurality of account providers:
generating a time-series decomposition over a historical anomaly score data set for the respective account provider, wherein the time-series decomposition comprises a trend data set, a seasonality data set, and a residual data set; and
determining that the respective account provider is a potential target of anomalous activity based on a normalized score of a latest value in the residual data set, the latest value representing a residual value associated with the calculated anomaly score for the respective account provider.

14. The system of claim 9, wherein the historical minimum score comprises a minimum score calculated from a time period over which the respective account provider was not subject to a concentrated attack, and the historical maximum anomaly score comprises a maximum score calculated from a time period over which the respective account provider was not subject to a concentrated attack.

15. The system of claim 9, wherein the threshold value for the respective account provider comprises a normalized value below which a threshold percentage of historical normalized aggregated anomaly scores for the respective account provider exists in a historical data set.

16. The system of claim 9, wherein the taking one or more actions to block completion of transactions requested by one or more accounts associated with the identified one or more account providers comprises terminating automatic processing of transactions associated with the identified one or more account providers.

17. A method for identifying and blocking anomalous activity within a computing system, comprising:
selecting a set of accounts for analysis, wherein the selected set of accounts comprise accounts associated with requests to perform activity using the computing system with respect to one of a plurality of account providers;
for each respective account in the selected set of accounts, calculating an anomaly score based on an account identifier associated with the respective account and properties of requests to perform activity within the computing system generated by a user associated with the respective account;
generating, for each respective account provider of a plurality of account providers, an aggregated anomaly score based on anomaly scores associated with each respective account in a set of accounts associated with the respective account provider;
normalizing the aggregated anomaly score for each respective account provider of the plurality of account providers based on a historical minimum score and a historical maximum anomaly score for the respective account provider;
based on a threshold value and the normalized aggregated anomaly score for each respective account provider, identifying one or more account providers that are potential targets of anomalous activity; and taking one or more actions to block activity generated by one or more accounts associated with the identified one or more account providers, wherein the one or more actions comprise terminating access to a software application for users associated with accounts associated with the identified one or more account providers.

18. The method of claim 17, wherein identifying the one or more account providers that are potential targets of anomalous activity comprises, for each respective account provider of the plurality of account providers:
   generating a time-series decomposition over a historical anomaly score data set for the respective account provider, wherein the time-series decomposition comprises a trend data set, a seasonality data set, and a residual data set; and
   determining that the respective account provider is a potential target of anomalous activity based on a normalized score of a latest value in the residual data set, the latest value representing a residual value associated with the calculated anomaly score for the respective account provider.

* * * * *